(12) United States Patent
Bradley

(10) Patent No.: US 6,748,120 B1
(45) Date of Patent: Jun. 8, 2004

(54) STEERABLE KERNEL FOR IMAGE INTERPOLATION

(75) Inventor: Andrew Peter Bradley, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/461,054

(22) Filed: Dec. 15, 1999

(30) Foreign Application Priority Data

Dec. 18, 1998 (AU) ............................................. PP7802

(51) Int. Cl.[7] .............................. G06K 9/32; G06K 9/40
(52) U.S. Cl. ........................................ 382/299; 382/260
(58) Field of Search ................................ 382/260, 279, 382/296, 299, 300, 275, 269; 358/525; 345/698

(56) References Cited

U.S. PATENT DOCUMENTS 5,054,100 A  * 10/1991  Tai .............................. 382/300
5,131,057 A  *  7/1992  Walowit et al. ............. 382/264

OTHER PUBLICATIONS

X–Y separable pyramid steerable scalable kernels, by Shy etal., IEEE, 1994, pp. 237–244.*
A wavelet visible difference predictor, by Bradley, IEEE 1999, pp. 717–730.*
The multiscale classifier, by Bradley et al., IEEE 1996, pp. 124–137.*
Hany Farid and Eero P. Simoncelli, "Optimally Rotation–Equivalent Direction Derivative Kernels", Proceedings of the 7th International Conference on Computer Analysis of Images and Patterns, Kiel, German, Sep. 1997.

* cited by examiner

*Primary Examiner*—Vikkram Bali
(74) *Attorney, Agent, or Firm*—Fitzpatrick, Cella, Harper & Scinto

(57) ABSTRACT

A method of providing a representation of image data is disclosed. The method accesses a plurality of discrete sample values of the image data and determines an angle of orientation of the sample values. Kernel values for each of the discrete sample values are then calculated using one of a plurality of first kernels, depending upon the angle of orientation of the discrete sample value. The first kernels are constructed by rotating a second kernel from a first angle of orientation to a second angle of orientation. Finally, the kernel values are convolved with the discrete sample values to provide a representation of said image data.

95 Claims, 10 Drawing Sheets

(a) Horizontal

| 1 | 1 | 1 |
|---|---|---|
| 0 | 0 | 0 |
| -1 | -1 | -1 |

(b) Vertical

| 1 | 0 | -1 |
|---|---|---|
| 1 | 0 | -1 |
| 1 | 0 | -1 |

(c) 45 degrees

| 0 | -1 | -1 |
|---|---|---|
| 1 | 0 | -1 |
| 1 | 1 | 0 |

(d) 135 degrees

| -1 | -1 | 0 |
|---|---|---|
| -1 | 0 | 1 |
| 0 | 1 | 1 |

FIG. 7.

STEERABLE KERNEL FOR IMAGE INTERPOLATION

FIELD OF INVENTION

The present invention relates to a method and apparatus for resolution conversion for multi-dimensional image data and in particular digital image data. The invention also relates to a computer program product including a computer readable medium having recorded thereon a computer program for resolution conversion of multi-dimensional image data and in particular digital image data.

BACKGROUND OF INVENTION

Prior art continuous kernels for digital data resolution conversion include the nearest neighbour (NN), linear quadratic and cubic kernels. The NN kernel is the simplest method of interpolation, simply interpolating the image with the pixel value that is spatially nearest to the required one. This method works quite well when the scaling ratio is an integral multiple of the original data as it introduces no new values, ie., no new colours, and preserves sharp edges. However, at other ratios it has the disadvantage of shifting edge locations which often produces visible distortions in the output image, especially in images containing text or fine line details.

Linear interpolation on the other hand allows for the introduction of new grey levels (or colours) that are effectively used to position edges at sub-pixel locations. This has the advantage of reducing the effect of shifted edge locations, however sharp edges can now appear to be blurred. Quadratic and cubic interpolation provide steeper step responses and therefore less edge blurring, however, the steeper response results in an overshoot on either side of the edge. These overshoots can make the edges in natural images appear sharper, but on text, fine lines, or on other computer generated graphics these overshoots are clearly visible and detract from the perceived image quality and text legibility.

In the prior art systems kernels such as the nearest neighbour (NN), linear, quadratic, and cubic kernels are often used by either applying them first to the rows of the image and then to the columns, known as a separable implementation, or a 2-dimensional kernel is formed and convolved directly with the image data. These are then termed bilinear and bicubic implementations. The disadvantage of the conventional interpolation kernels is that they interpolate mainly using pixel values from the horizontal and vertical directions relative to the interpolated pixel. Therefore, when interpolating an oblique edge, pixel values on either side of the edge are primarily used in the interpolation rather than pixels along the edge. This results in an interpolated edge that no longer appears to be smooth, but appears to be jagged. These artefacts are commonly referred to as jaggies and are illustrated for NN, bilinear, and bicubic interpolation kernels in FIG. 1 for an eight times expansion factor of an original oblique edge. It can be seen that the jaggies are most pronounced for the NN interpolator and become progressively less objectionable for the bilinear and the bicubic interpolators respectively. However, even for the bicubic interpolator the jaggies are still noticeable and it can be seen that the reduction in the jaggy effect is achieved at the expense of increased edge blur (an effect that is particularly noticeable on the bilinear interpolator).

It is an object of the present invention to ameliorate one or more disadvantages of the prior art.

SUMMARY OF THE INVENTION

According to one aspect of the present invention there is provided a method of providing a representation of image data, the method comprising the following steps:

(i) accessing a plurality of discrete sample values of said image data;

(ii) determining an angle of orientation of said sample values;

(iii) calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and (iv) convolving said kernel values with said discrete sample values to provide a representation of said image data.

According to another aspect of the present invention there is provided an apparatus for providing a representation of image data, the apparatus comprising:

accessing means for accessing a plurality of discrete sample values of said image data;

angle orientation determining means for determining an angle of orientation of said sample values;

calculating means for calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and convolving means for convolving said kernel values with said discrete sample values to provide a representation of said image data.

According to still another aspect of the present invention there is provided a computer readable medium for storing a program for an apparatus which processes data, said processing comprising a method of providing a representation of image data, said program comprising:

code for accessing a plurality of discrete sample values of said image data;

code for determining an angle of orientation of said sample values;

code for calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and code for convolving said kernel values with said discrete sample values to provide a representation of said image data.

According to still another aspect of the present invention there is provided a method of providing a representation of image data, the method comprising the following steps:

(i) accessing a plurality of discrete sample values of said image data;

(ii) determining an angle of orientation of each said sample values;

(iii) calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and (iv) convolving said kernel values with said discrete sample values to provide a representation of said image data, wherein said first kernels are of the form:

$$h(s_x, s_y)_{\theta=0} = \frac{1}{\sqrt{2}} \{h(s_x)_{c=0.5} \cdot h(s_y)_{c=0}\}$$

$$h(s_x, s_y)_{\theta=\pi/2} = \frac{1}{\sqrt{2}} \{h(s_x)_{c=0} \cdot h(s_y)_{c=0.5}\}$$

$$h(s_x, s_y)_{\theta=\pi/4} = \frac{1}{\sqrt{2}} \left\{ h\left(\frac{s_x+s_y}{2}\right)_{c=0.5} \cdot h\left(\frac{s_x-s_y}{\sqrt{2}}\right)_{c=0} \right\}$$

$$h(s_x, s_y)_{\theta=3\pi/4} = \frac{1}{\sqrt{2}} \left\{ h\left(\frac{s_x+s_y}{\sqrt{2}}\right)_{c=0} \cdot h\left(\frac{s_x-s_y}{2}\right)_{c=0.5} \right\}$$

and wherein $s=t/\Delta t$ and $\theta$ is the angle of orientation of the sample.

According to still another aspect of the present invention there is provided an apparatus for providing a representation of image data, said apparatus comprising:

accessing means for accessing a plurality of discrete sample values of said image data;

angle of orientation determining means for determining an angle of orientation of each said sample values;

calculating means for calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and convolving means for convolving said kernel values with said discrete sample values to provide a representation of said image data, wherein said first kernels are of the form:

$$h(s_x, s_y)_{\theta=0} = \frac{1}{\sqrt{2}} \{h(s_x)_{c=0.5} \cdot h(s_y)_{c=0}\}$$

$$h(s_x, s_y)_{\theta=\pi/2} = \frac{1}{\sqrt{2}} \{h(s_x)_{c=0} \cdot h(s_y)_{c=0.5}\}$$

$$h(s_x, s_y)_{\theta=\pi/4} = \frac{1}{\sqrt{2}} \left\{ h\left(\frac{s_x+s_y}{2}\right)_{c=0.5} \cdot h\left(\frac{s_x-s_y}{\sqrt{2}}\right)_{c=0} \right\}$$

$$h(s_x, s_y)_{\theta=3\pi/4} = \frac{1}{\sqrt{2}} \left\{ h\left(\frac{s_x+s_y}{\sqrt{2}}\right)_{c=0} \cdot h\left(\frac{s_x-s_y}{2}\right)_{c=0.5} \right\}$$

and wherein $s=t/\Delta t$ and $\theta$ is the angle of orientation of the sample.

According to still another aspect of the present invention there is provided a computer readable medium for storing a program for an apparatus which processes data, said processing comprising a method of providing a representation of image data, said program comprising:

code for accessing a plurality of discrete sample values of said image data;

code for determining an angle of orientation of each said sample values;

code for calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and code for convolving said kernel values with said discrete sample values to provide a representation of said image data, wherein said first kernels are of the form:

$$h(s_x, s_y)_{\theta=0} = \frac{1}{\sqrt{2}} \{h(s_x)_{c=0.5} \cdot h(s_y)_{c=0}\}$$

$$h(s_x, s_y)_{\theta=\pi/2} = \frac{1}{\sqrt{2}} \{h(s_x)_{c=0} \cdot h(s_y)_{c=0.5}\}$$

$$h(s_x, s_y)_{\theta=\pi/4} = \frac{1}{\sqrt{2}} \left\{ h\left(\frac{s_x+s_y}{2}\right)_{c=0.5} \cdot h\left(\frac{s_x-s_y}{\sqrt{2}}\right)_{c=0} \right\}$$

$$h(s_x, s_y)_{\theta=3\pi/4} = \frac{1}{\sqrt{2}} \left\{ h\left(\frac{s_x+s_y}{\sqrt{2}}\right)_{c=0} \cdot h\left(\frac{s_x-s_y}{2}\right)_{c=0.5} \right\}$$

and wherein $s=t/\Delta t$ and $\theta$ is the angle of orientation of the sample.

According to still another aspect of the present invention there is provided a method of providing a representation of image data, the method comprising the following steps:

(i) accessing a plurality of discrete sample values of said image data;

(ii) determining an angle of orientation of each said sample values;

(iii) calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and (iv) convolving said kernel values with said discrete sample values to provide a representation of said image data, wherein said first kernels are of the form:

$$h(s_x, s_y)_{0 \leq \theta \leq \pi/2} = \frac{1}{\sqrt{2}} \{h(1 - 2\theta/\pi)s_x + (2\theta/\pi)s_y)_{c=0.5} \cdot$$
$$h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}} \{h((2\theta/\pi - 1)s_x + (2\theta/\pi - 2)s_y)_{c=0.5} \cdot$$
$$h(((2\theta/\pi - 2)s_x + (1 - 2\theta/\pi)s_y)w(\theta))_{c=0}\},$$

and wherein $s=t/\Delta t$ and $\theta$ is the angle of orientation of the sample.

According to still another aspect of the present invention there is provided an apparatus for providing a representation of image data, said apparatus comprising:

accessing means for accessing a plurality of discrete sample values of said image data;

angle of orientation determining means for determining an angle of orientation of each said sample values;

calculating means for calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and convolving means for convolving said kernel values with said discrete sample values to provide a representation of said image data, wherein said first kernels are of the form:

$$h(s_x, s_y)_{0 \leq \theta \leq \pi/2} = \frac{1}{\sqrt{2}} \{h(1 - 2\theta/\pi)s_x + (2\theta/\pi)s_y)_{c=0.5} \cdot$$
$$h(((2\theta/\pi)s_x + (2\theta/\pi - 1)s_y)w(\theta))_{c=0}\}$$

-continued $$h(s_x, s_y)_{\pi/2 < \theta < \pi} = \frac{1}{\sqrt{2}} \{h((2\theta/\pi - 1)s_x + (2\theta/\pi - 2)s_y)_{c=0.5} \cdot$$

$$h(((2\theta/\pi - 2)s_x + (1 - 2\theta/\pi)s_y)w(\theta))_{c=0}\},$$

and wherein s=t/Δt and θ is the angle of orientation of the sample.

According to still another aspect of the present invention there is provided a computer readable medium for storing a program for an apparatus which processes data, said processing comprising a method of providing a representation of image data, said program comprising:

code for accessing a plurality of discrete sample values of said image data;

code for determining an angle of orientation of each said sample values;

code for calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and code for convolving said kernel values with said discrete sample values to provide a representation of said image data, wherein said first kernels arc of the form:

$$h(s_x, s_y)_{0 \le \theta \le \pi/2} = \frac{1}{\sqrt{2}} \{h(1 - 2\theta/\pi)s_x + (2\theta/\pi)s_y)_{c=0.5} \cdot$$

$$h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}} \{h((2\theta/\pi - 1)s_x + (2\theta/\pi - 2)s_y)_{c=0.5} \cdot$$

$$h(((2\theta/\pi - 2)s_x + (1 - 2\theta/\pi)s_y)w(\theta))_{c=0}\},$$

and wherein s=t/Δt and θ is the angle of orientation of the sample.

According to still another aspect of the present invention there is provided a method of converting a first set of discrete data sample values of an image having a first sample rate to a second set of discrete data sample values of said image having a second sample rate, the method comprising the following steps:

(i) accessing said first set of data sample values; and
(ii) performing the following operations for each data value of said second set;
   (a) determining an angle of orientation for each of said discrete sample values of said first set;
   (b) calculating kernel values for each of said discrete sample values of said first set, according to one of a plurality of first kernels depending upon the angle of orientation of each of said discrete sample values, wherein said first kernels are constructed by rotating a second kernel from a first angle of orientation to a second angle of orientation; and
   (c) convolving said kernel values with said discrete sample values of said first data set to provide a current data value of said second set.

According to still another aspect of the present invention there is provided an apparatus for converting a first set of discrete data sample values of an image having a first sample rate to a second set of discrete data sample values of said image having a second sample rate, the method comprising the following steps:

accessing means for accessing said first set of data sample values; and processing means for performing the following operations for each data value of said second set;

(a) determining an angle of orientation for each of said discrete sample values of said first set;
   (b) calculating kernel values for each of said discrete sample values of said first set, according to one of a plurality of first kernels depending upon the angle of orientation of each of said discrete sample values, wherein said first kernels are constructed by rotating a second kernel from a first angle of orientation to a second angle of orientation; and
   (c) convolving said kernel values with said discrete sample values of said first data set to provide a current data value of said second set.

According to still another aspect of the present invention there is provided a computer readable medium for storing a program for an apparatus which processes data, said processing comprising a method of converting a first set of discrete data sample values of an image having a first sample rate to a second set of discrete data sample values of said image having a second sample rate, said program comprising:

code for accessing said first set of data sample values; and code for performing the following operations for each data value of said second set;

(a) determining an angle of orientation for each of said discrete sample values of said first set;
   (b) calculating kernel values for each of said discrete sample values of said first set, according to one of a plurality of first kernels depending upon the angle of orientation of each of said discrete sample values, wherein said first kernels are constructed by rotating a second kernel from a first angle of orientation to a second angle of orientation; and
   (c) convolving said kernel values with said discrete sample values of said first data set to provide a current data value of said second set.

According to still another aspect of the present invention there is provided a method of generating a steerable kernel for image processing, the method comprising the following steps:

(i) accessing a kernel for image processing;
(ii) rotating said kernel from a first angle of orientation to a second angle of orientation to form a steerable kernel; and
(iii) storing said rotated kernel.

BRIEF DESCRIPTION OF THE DRAWINGS

Embodiments of the invention are described with reference to the drawings, in which:

FIGS. 7A to 7D show the rotated Prewitt operators used for calculating edge strength and orientation according to the preferred embodiment;

Figure 1:
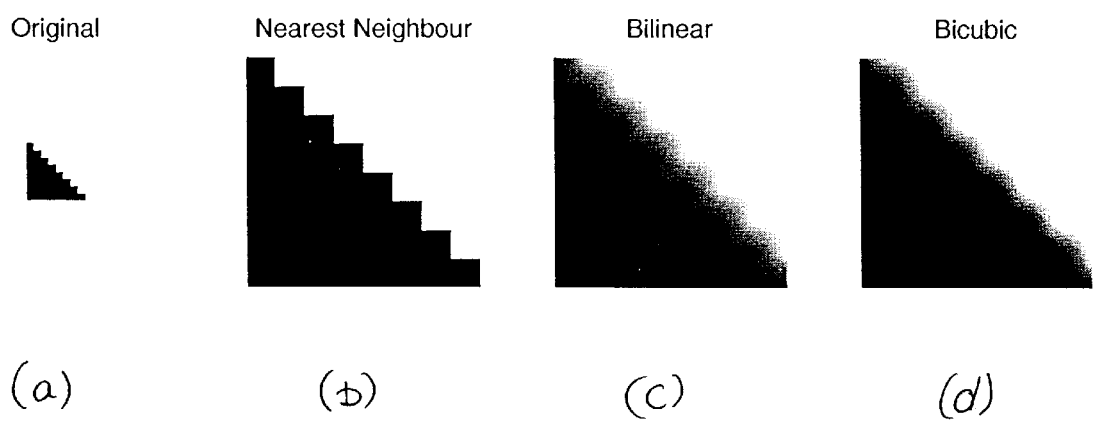
FIGS. 1A to 1D show the effect of jaggies on an interpolated edge using different interpolation kernels.

Appendix A shows the pseudo code that defines the kernel selection method of the first embodiment of the present invention; and Appendix B shows the pseudo code that defines the kernel selection method of the second embodiment of the present invention.

DETAILED DESCRIPTION

The embodiments disclose a method that, particularly on oblique edges, reduces both the edge jaggy and blurring effects.

Where reference is made in any one or more of the drawings to steps and/or features, which have the same reference numerals, those steps and/or features are for the purposes of the description the same, unless the contrary appears.

When interpolating in an edge region of an image it is important to smooth along the edge, but not across the edge. In this way the edge contour is kept smooth, whilst the edge transition is kept sharp. The preferred embodiment discloses a method of creating 2-dimensional interpolation kernels that provide a high degree of smoothing along the length of an edge whilst minimising the amount of blur and ringing across the edge.

Initially the case of a 1-dimensional continuous kernel convolution is described. Let $f(k\Delta t)$ ($k= \ldots -2, -1, 0, 1, 2, \ldots$) be the samples of a continuous function $f(t)$, where $\Delta t$ is the sampling rate. Interpolation with a continuous kernel gives a continuous function $g(t)$, that is an approximation of $f(t)$, and is given by the finite convolution sum:

$$g(t) = \Sigma f(k\Delta t) h(t - k\Delta t) \quad (1)$$

where $h(t)$ is the continuous interpolation kernel. The sample rate $\Delta t$ does not have to be constant, but should conform to the Nyquist rate. In the preferred embodiment, the cubic interpolation kernel defined in Equation (2) is used, though quadratic, linear, and nearest neighbour kernels can also be used. The two-parameter Catmull-Rom cubic has a kernel of the form:

$$h(s) = \begin{cases} \left(2 - \frac{3}{2}b - c\right)|s|^3 + (-3 + 2b + c)|s|^2 + \left(1 - \frac{1}{3}b\right), & |s| \le 1 \\ \left(-\frac{1}{6}b - c\right)|s|^3 + (b + 5c)|s|^2 + (-2b - 8c)|s| + \left(\frac{4}{3}b + 4c\right), & 1 < |s| \le 2 \\ 0, & \text{Otherwise} \end{cases} \quad (2)$$

where $s = t/\Delta t$ is a normalised coordinate that has integer values at the original sample points. Choosing the parameters b and c (b=0, c=0.5), the interpolating cubic agrees with the first three terms of the Taylor series expansion of the original function, and (b=1, c=0) which is the approximating cubic B-spline. All of the kernels used are, by definition, of finite support and symmetrical about s=0. With b=0 the cubic kernel can be shown to be an interpolating kernel, ie. the interpolated function passes through the sample points of the original function, as $h(0)=1$, while $h(k\Delta t)=0$ for $k \ne 0$ which ensure that $g(k\Delta t)=f(k\Delta t)$. From Equation (1) any sample of $g(t)$ can be calculated using the continuous kernel, $h(t)$, and a finite number (say $\le 4$) of original sampled points, $f(k\Delta t)$. For example, the conventional 1-dimensional cubic kernel (b=0, c=0.5) requires the two nearest original samples on either side of the point being interpolated.

The conventional extension of the cubic kernel to 2-dimensions is the separable extension. This means that the convolution kernel can be applied to the image data in one of two ways.

(i) Applying the 1-dimensional convolution kernel to the rows of the image and then using these interpolated values to interpolate along the columns of the image (or vice-versa). For example, the conventional cubic kernel has four coefficients and requires the four nearest samples for both the rows and the columns in turn. This technique however, has the disadvantage of requiring intermediate storage of interpolated values, which can make it unsuitable for a hardware implementation, for example.

(ii) A 2-dimensional kernel can be generated and then be convolved directly with the image data. The 2-dimensional kernel is generated using matrix multiplication of the coefficient values calculated for the rows and the columns separately. For example, the conventional bicubic kernel has 16 (4×4) coefficients while the bilinear kernel has four, (2×2). These 2-dimensional blocks of coefficients are then convolved directly with the same size block of nearest neighbour original image pixels around the sample being interpolated. This method has the advantage of not requiring any intermediate storage, but does require more multiplication operations. The method also has the advantage of allowing the implementation of non-separable kernels, which could not be implemented on the rows and columns separately.

Figure 2:
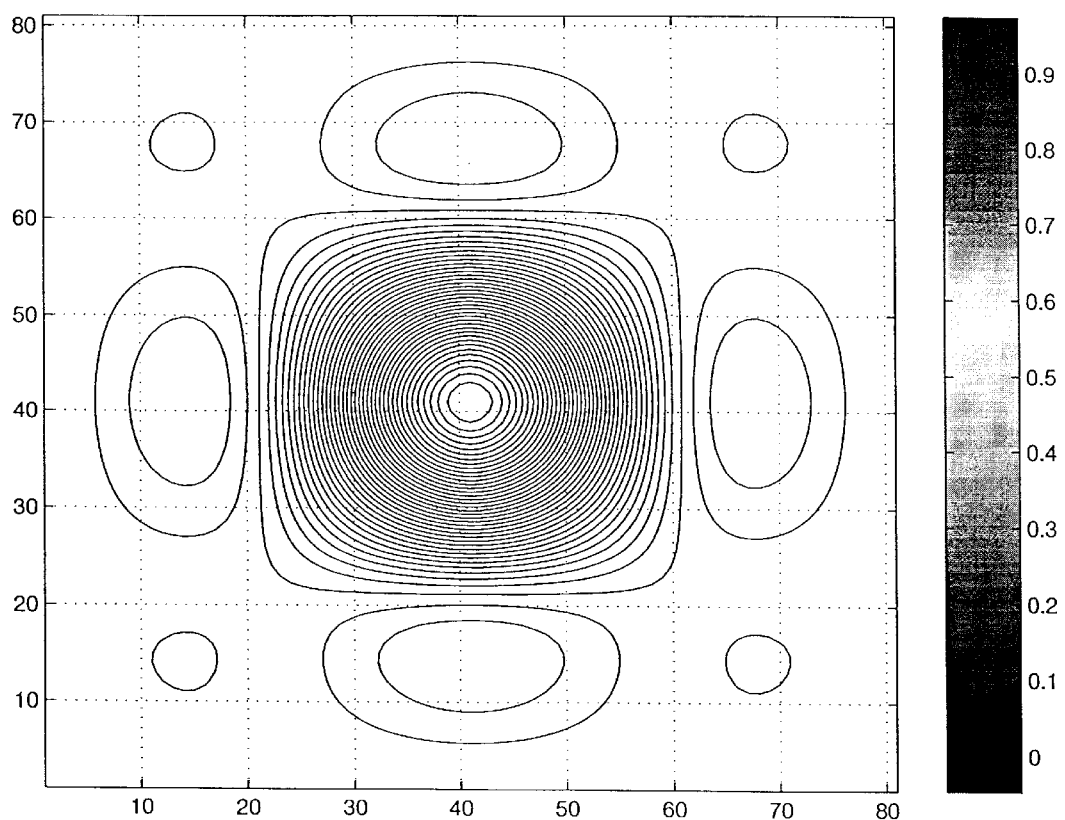
FIG. 2 shows a contour plot for a conventional 2-dimensional kernel, with parameters b=0 and c=0.5.

A contour plot for the conventional 2-dimensional cubic kernel, with parameters b=0, c=−0.5, is shown in FIG. 2. It can be seen that the kernel primarily uses pixel values from the horizontal and vertical directions relative to the interpolated pixel (which would be at the centre of the kernel). In other words, the coefficient values from any diagonal of the kernel are approximately zero and therefore pixel values in these areas have little effect in the convolution sum of Equation (1). This results in the jaggies and blurring effects already discussed, and illustrated in FIG. 1.

Unless otherwise stated the following discussion refers to an interpolating cubic kernel with parameter b=0. For the cases of horizontal or vertical edges different cubic kernels in each of the directions are effectively used by choosing different values of the c parameter. For example, a kernel suitable for interpolating vertical edges can be obtained if values of $c_x = 0$ in the horizontal direction and $c_y = -0.5$ in the vertical direction are used. This kernel is two coefficients wide and four coefficients high and has the orientation $\pi/2$ (90°) kernel shown in FIG. 4(c). A kernel suitable for interpolating horizontal edges is obtained by using values $c_x = -0.5$ and $c_y = 0$, and is shown in FIG. 4(a).

The first embodiment is a method that utilises interpolation kernels not only for horizontal (0) and vertical ($\pi/2$) edges, but for edges that can also be oriented at angles of 45° ($\pi/4$) and 135° ($3\pi/4$). The second embodiment of the present invention discloses a steerable interpolation kernel that can be aligned exactly with edge orientation, ie. at any arbitrary angle between 0 and $\pi$. Edge angles between $\pi$ and $2\pi$ are equivalent to angles between 0 and $\pi$ r by $-\pi$ (e.g., $5\pi/4 = 5\pi/4 - \pi = \pi/4$), alternatively edge angles in the range 0 to $-\pi$ are equivalent to angles between 0 and $\pi$ by $+\pi$ (e.g., $-\pi/4 = -\pi/4 + \pi = 3\pi/4$).

Though the first embodiment of the present invention (steerable only to angles 0, $\pi/4$, $\pi/2$ and $3\pi/4$) is a subset of the second embodiment (the fully steerable kernel), the first embodiment can often provide sufficient flexibility and has advantages over the fully steerable scheme.

Figure 3:
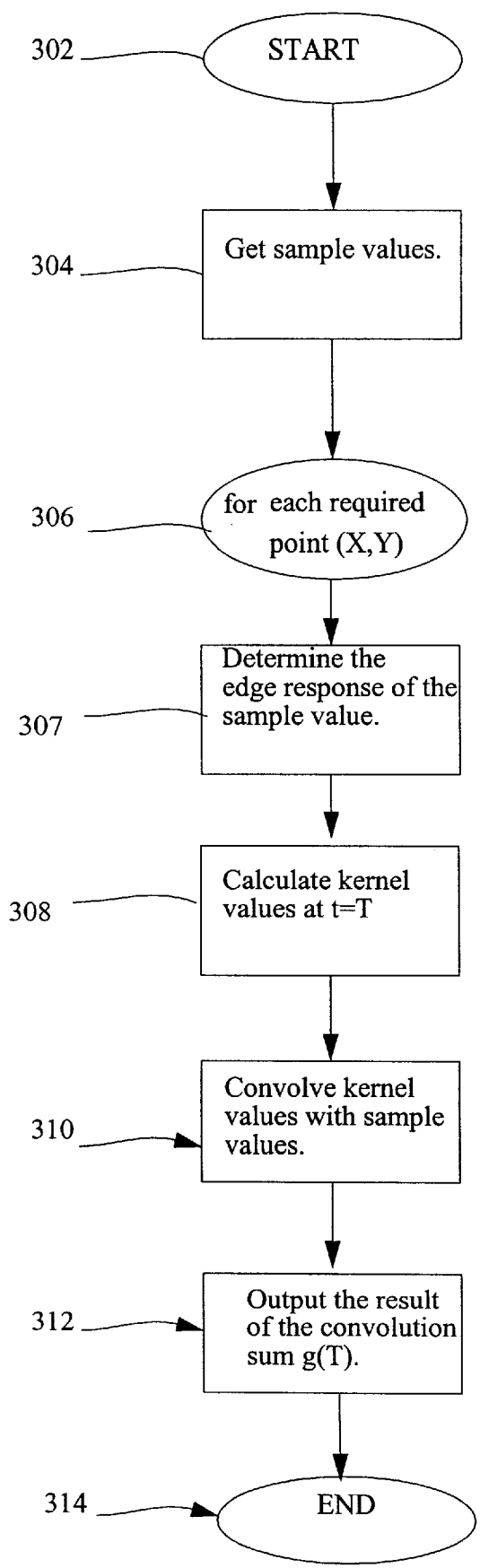
FIG. 3 is a flow diagram of a method of interpolating digital data in accordance with a preferred embodiment of the invention.

FIG. 3 is a flow diagram of a method of resampling image data in accordance with a preferred embodiment of the invention. The method commences at step 302 and any necessary processes and parameters are initialised. At the next step 304, sample values in the form $f(k\Delta x, k\Delta y)$ ($k = -n \ldots -2, -1, 0, 1, 2, \ldots n$), where $\Delta x$ and $\Delta y$ are the horizontal and vertical sampling rates respectively, are retrieved for processing. The process continues at step 306, where for each required output sample point (x,y) steps 307–312 are completed as follows. At step 307, the strength and orientation (θ) of the edge to be interpolated are determined. At the next step 308, kernel values h(X−kΔx, Y−kΔy) are calculated in accordance with the kernel of the preferred embodiment, where h($s_x$, $s_y$) is given by:

$$h(s_x, s_y)_{\theta=0} = \frac{1}{\sqrt{2}} \{h(s_x)_{c=0.5} \cdot h(s_y)_{c=0}\} \quad (3)$$

$$h(s_x, s_y)_{\theta=\pi/2} = \frac{1}{\sqrt{2}} \{h(s_x)_{c=0} \cdot h(s_y)_{c=0.5}\} \quad (4)$$

$$h(s_x, s_y)_{\theta=\pi/4} = \frac{1}{\sqrt{2}} \left\{ h\left(\frac{s_x+s_y}{2}\right)_{c=0.5} \cdot h\left(\frac{s_x-s_y}{\sqrt{2}}\right)_{c=0} \right\} \quad (5)$$

$$h(s_x, s_y)_{\theta=3\pi/4} = \frac{1}{\sqrt{2}} \left\{ h\left(\frac{s_x+s_y}{\sqrt{2}}\right)_{c=0} \cdot h\left(\frac{s_x-s_y}{2}\right)_{c=0.5} \right\} \quad (6)$$

where $s_x = x/\Delta x$ and $s_y = y/\Delta y$ are re-sampling distances in the horizontal and vertical directions, respectively, and indicates matrix multiplication. At step 310, the sample values, f(kΔx, kΔy), are convolved with the kernel values h($s_x$, $s_y$), according to the finite convolution sum:

$$g(X,Y) = \Sigma f(k\Delta x, k\Delta y) h(X-k\Delta x, Y-k\Delta y), \quad (4)$$

at the point (X,Y). The process continues at step 312 where the result of the convolution sum (ie: the interpolated sample g(X,Y)) is output. The process terminates at 314 when all the required/requested sample values have been calculated.

For a more detailed explanation of the kernels according to the preferred embodiment, reference is made to the following paragraphs.

Orientations of 0 and π/2 are obtained using the conventional separable extension of the cubic kernel, however, parameter values $c_x=0.5$, $c_y=0$ and $c_x=0.5$, $c_y=0.5$, respectively are used. Orientations of π/4 and 3π/4 are obtained by effectively calculating the two 1-dimensional cubic kernels at these oblique orientations and then using matrix multiplication to obtain the 2-dimensional kernel. Therefore, if we indicate re-sampling distances in the horizontal and vertical directions by $s_x$ and $s_y$ respectively, we can calculate the coefficient values along a linear plane perpendicular to π/4 and 3π/4 using ($s_x+s_y$)/2 and ($s_x-s_y$)/2 respectively. Additional constraints are that the coefficients must sum to one (giving unity gain and no DC ripple) and the filter is at most two coefficients wide across the edge, ie. the three coefficients that are anti-diagonal to the edge and zero (so as to minimise edge blurring). Therefore, to obtain a kernel with an orientation of π/4 we calculate the first cubic kernel using ($s_x+s_y$)/2 as the input distance (c=0.5) and the second cubic kernel with ($s_x-s_y$)/√2 as the input distance (c=0). The difference in scaling for the second kernel, which will interpolate across the edge, is to limit its width to at most two coefficients and therefore minimise edge blurring. To ensure that the coefficients sum to approximately one the coefficients are scaled by 1/√2 after they have been multiplied together. To obtain a kernel orientation of 3π/4 the cubic kernels are calculated using ($s_x-s_y$)/2 (c=0.5) and ($s_x+s_y$)/√2 (c=0) as the input distances and again scaled by 1/√2. All four of the kernels are as defined above.

Figure 4:
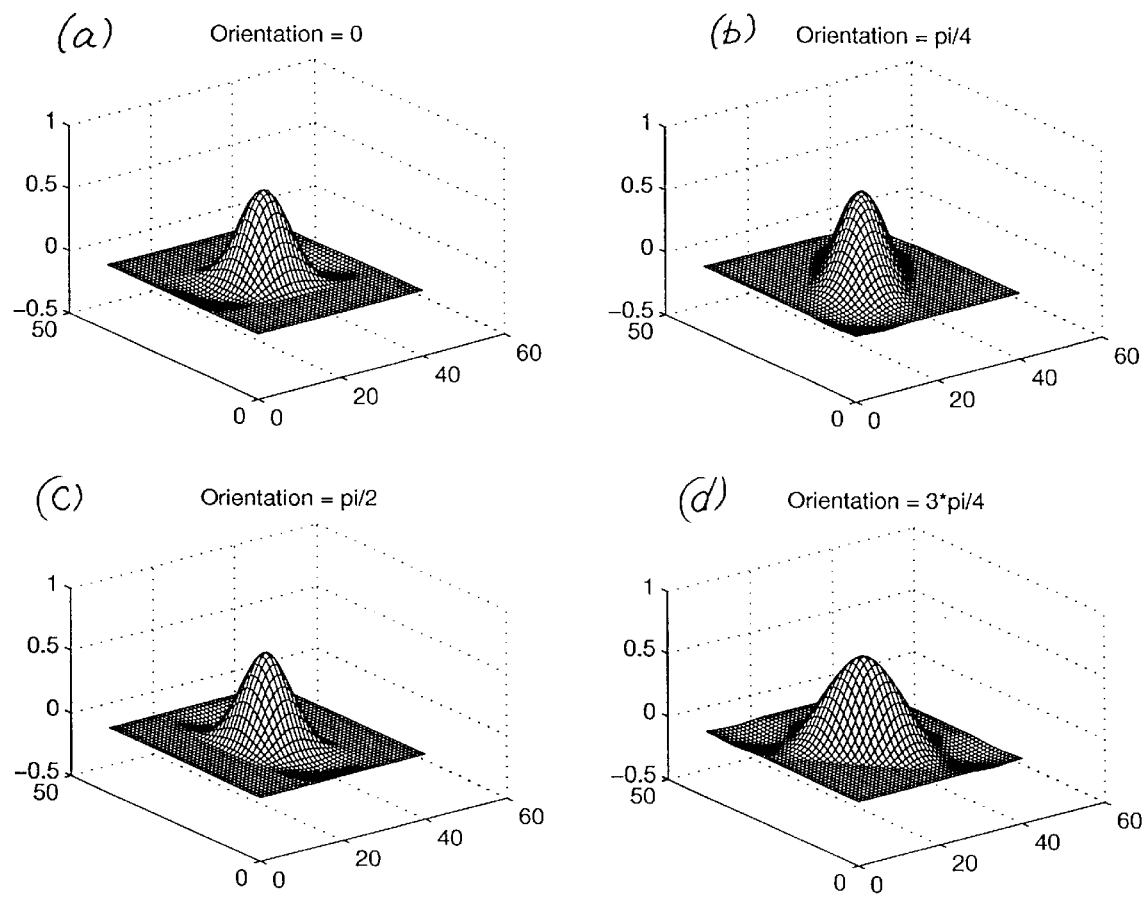
FIGS. 4A to 4D show mesh plots of the kernels according to a first embodiment.
Figure 5:
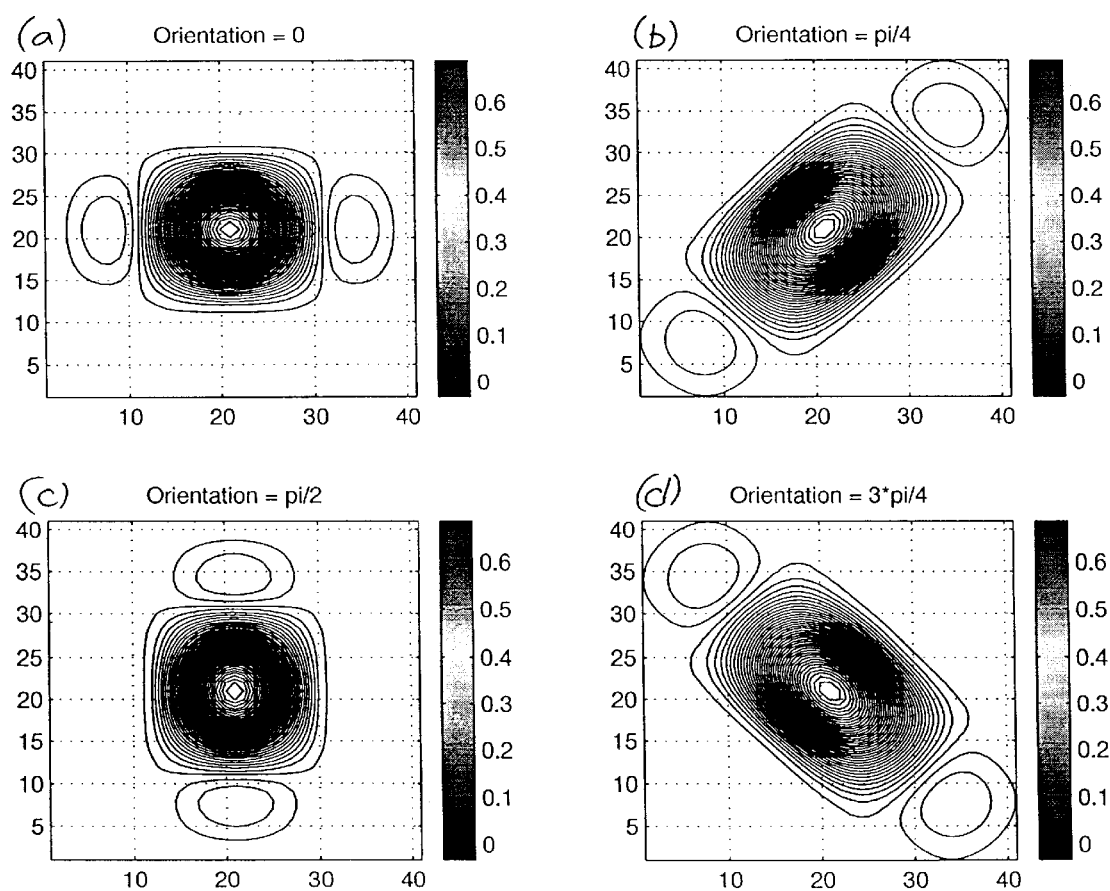
FIGS. 5A to 5D show contour plots of the kernels according to the first embodiment.
Figure 6:
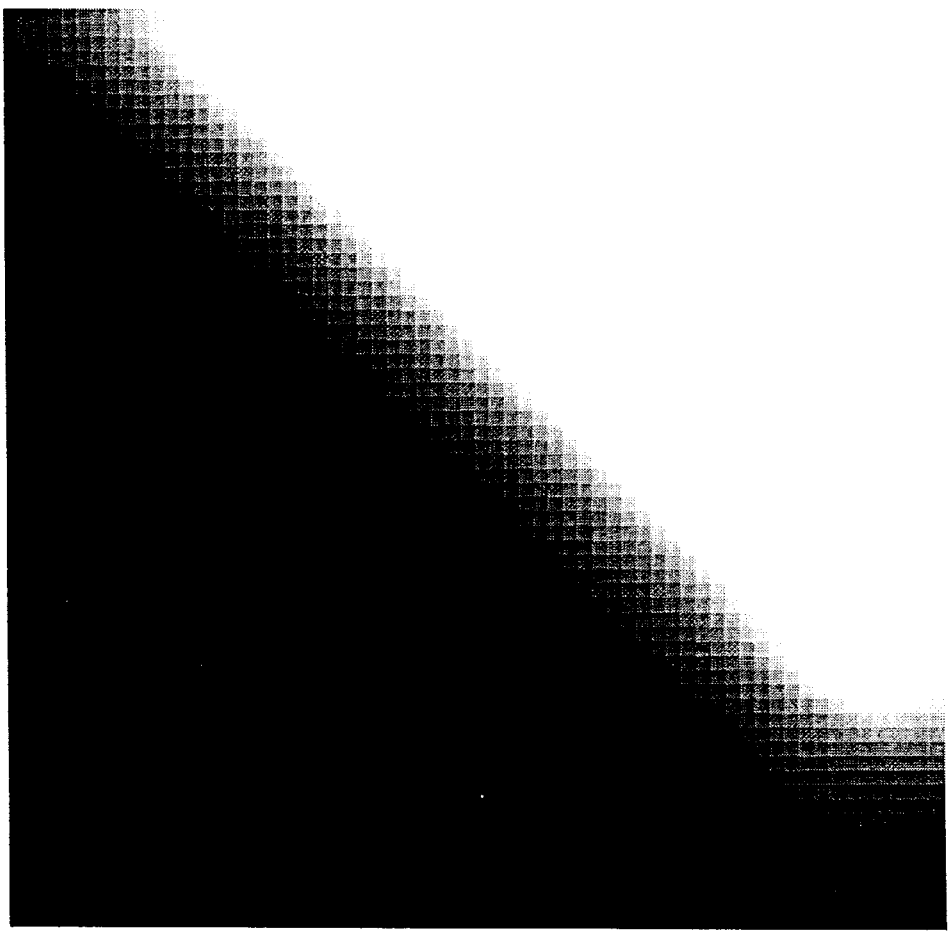
FIG. 6 shows the efficacy of the interpolation kernel of the first embodiment used on the same input as in FIG. 1.

Mesh and contour plots of the kernels of the preferred embodiment are shown in FIGS. 4 and 5 respectively. It should be noted that the orientations of the kernels shown in FIGS. 4 and 5 are used to interpolate edges that are perpendicular to the kernel orientation, eg. a kernel of orientation π/4 is used to interpolate an edge of orientation 3π/4. The efficacy of the disclosed interpolation kernel is demonstrated in FIG. 6, for an eight times expansion factor of the original oblique edge illustrated in FIG. 1. It can be seen from FIG. 6 that both the edge jaggies and blurring have been significantly reduced.

In the first embodiment, edge strength and orientation is calculated using the rotated Prewitt operators shown in FIG. 7. Each of the filters shown in FIG. 7 are convolved in turn with the image data and the magnitude of the responses stored (due to the coefficients that are common to multiple directions, this can be done in an efficient manner). The edge responses at each pixel are then used to determine which interpolation kernel to use at each new sample point. If the magnitude of the response of all the edge detectors is below a preset threshold it is considered to be a smooth area and the conventional cubic kernel is used. If the response magnitude is above the preset threshold then the edge direction with the maximum response is used to select which steerable cubic kernel to use. Appendix A sets out the pseudo code that defines the kernel selection method of the first embodiment.

A number of edge detectors can be used to gain this information such as Roberts or Sobel operators. In addition, a number of non-linear edge detectors can also be used, such as a Volterra filter or a variance based edge detector that measures directional homogeneity in a local pixel neighbourhood.

Figure 9:
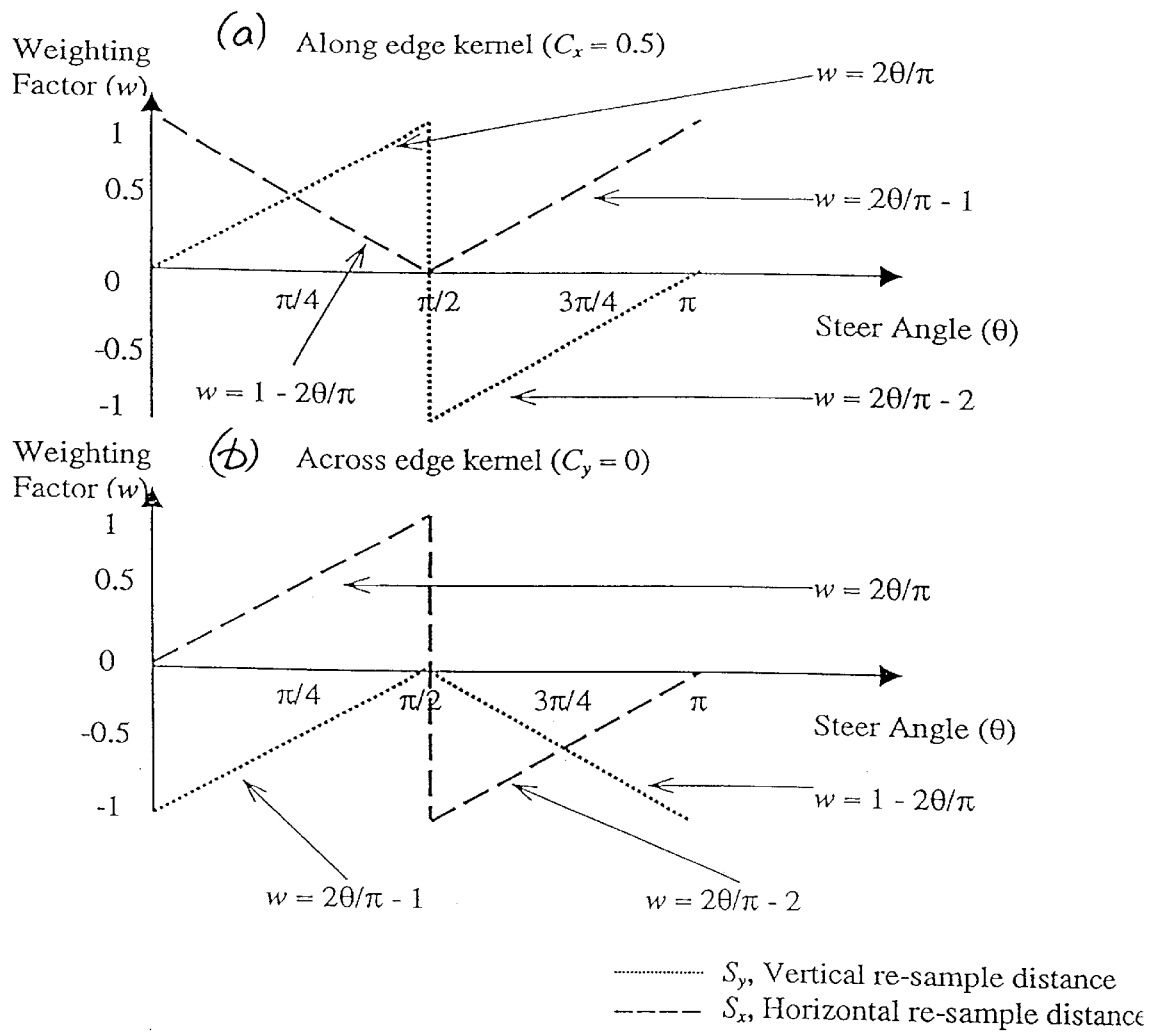
FIGS. 9A and 9B show a linear weighting interpolation kernel in accordance with a second embodiment of the present invention.
Figure 10:
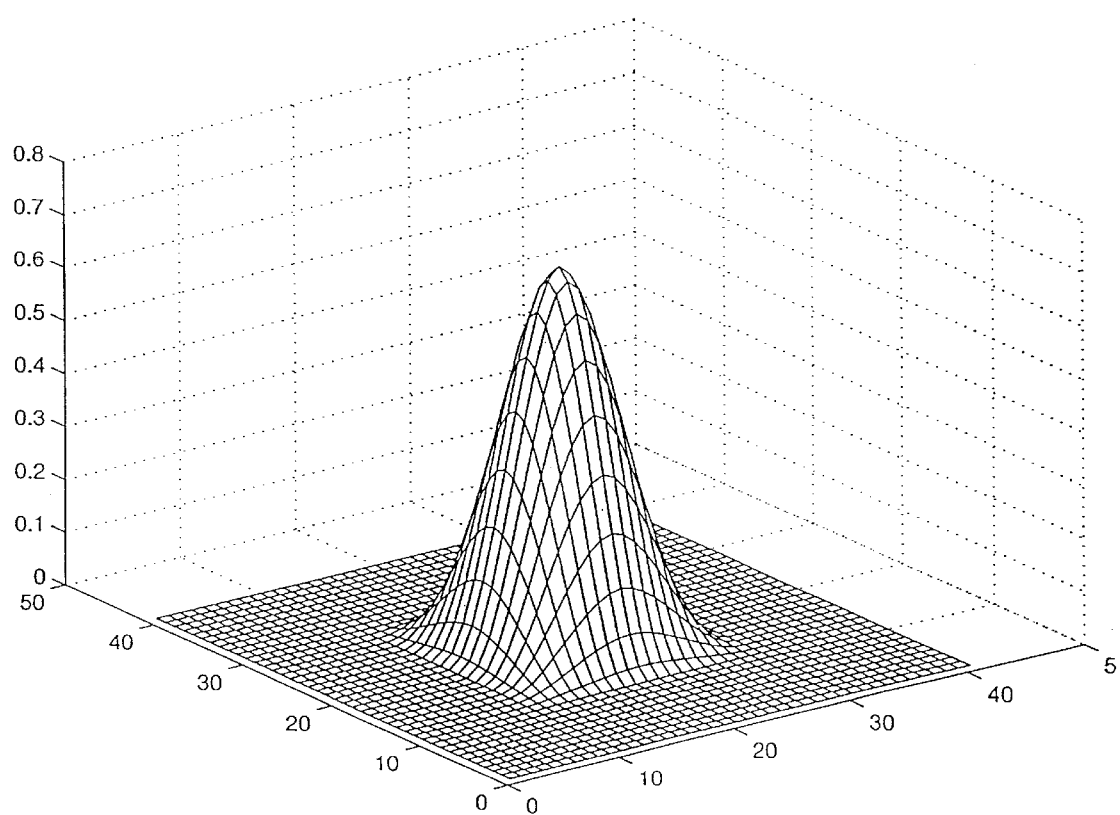
FIG. 10 shows a mesh plot of the kernel of FIG. 9.

The second embodiment of the present invention discloses an extension of the steerable kernels to arbitrary angles, in the range 0 to π. This is done utilising a linear combination of the re-sampling distances, $s_x$ and $s_y$, which vary with steering angle, θ. In this way, we calculate weighting factors for both $s_x$ and $s_y$, for two perpendicular kernels, the along edge kernel and the across edge kernel. FIG. 9 illustrates the linear weighting functions used for the second embodiment of the present invention. Note that the absolute values of the weights for $s_x$ and $s_y$ are constrained to sum to unity and that the weighting factors calculated using these functions for steer angles, 0, π/4, π/2, and 3π/4 are equivalent to the corresponding, weighting factors used in the first embodiment. The second embodiment of the present invention effectively calculates coefficient values along two perpendicular planes, one along the edge direction, generating what we call the along edge kernel, and one perpendicular to the edge direction, generating the across edge kernel. The added benefit of the second embodiment is that these planes can be oriented at arbitrary angles in the range 0 to π and used to generate steerable interpolation kernels at arbitrary angles in the range 0 to π. Therefore, the interpolation kernels will fit an edge at any arbitrary angle as long as the edge is approximately locally linear, ie. any edge that is not highly curved or at the intersection of two edges (a corner). If a highly curved or corner edge is detected then the kernel can be modified so that the parameters of both cubic kernels, $c_x$ and $c_y$, equal 0. In this way the kernel takes on the shape of the across edge kernel in both directions and the corner is preserved. A mesh plot of this kernel is shown in FIG. 10. Appendix B sets out the pseudo code that defines the kernel selection method of the first embodiment The remaining kernel design constraint, which was also used in the first embodiment, is that the across edge kernel be two coefficients wide. This constraint is met using an additional weighting function w(θ) in the definition of the fully steerable kernels:

$$(s_x, s_y)_{0 \leq \theta \leq \pi/2} = \frac{1}{\sqrt{2}} \{h(1 - 2\theta/\pi)s_x + (2\theta/\pi)s_y)_{c=0.5} \cdot \quad (7)$$
$$h(((2\theta/\pi)s_x + (2\theta/\pi - 1)s_y)w(\theta))_{c=0}\}$$

$$h(s_x, s_y)_{\pi/2<\theta<\pi} = \frac{1}{\sqrt{2}}\{h((2\theta/\pi - 1)s_x + (2\theta/\pi - 2)s_y)_{c=0.5} \cdot \quad (8)$$
$$h(((2\theta/\pi - 2)s_x + (1 - 2\theta/\pi)s_y)w(\theta))_{c=0}\},$$

The across edge weighting factor, w(θ), is a smooth function constrained to pass through 1 when θ=0, π/2, and π and through √2 when θ=π/4 and 3π/4. The used in the preferred embodiment is as follows:

$$w(\theta) = 1 + \frac{\sqrt{2}-1}{2} - \left(\frac{\sqrt{2}-1}{2}\cos(4\theta)\right) \quad (9)$$

It can be seen that the steerable kernels disclosed in Equations 4, 5, 6 and 7 are a subset of the fully steerable kernels disclosed in Equations 7, 8 and 9.

In order to apply the fully steerable interpolation kernels we need to calculate both edge strength (magnitude) and edge angle at each pixel in the input image. There are a number of known methods for doing this, but in the second embodiment optimally rotation-equivalent directional derivative kernels are used. For further details of these kernels refer to "Optimally Rotation-equivalent Directional Derivative Kernels", Hany Farid and Eero P Simoncelli, Proceedings of the 7$^{th}$ International Conference on Computer Analysis of Images and Patterns, Kiel, Germany, September 1997. The coefficients used in the second embodiment are given below:

TABLE 1

| Low-pass | 0.036420 | 0.248972 | 0.429217 | 0.248972 | 0.036420 |
|---|---|---|---|---|---|
| High-pass | −0.108415 | −0.280353 | 0 | 0.280353 | 0.108415 |

As is known in the prior art the coefficients are applied separably to the image to detect edge strength in the vertical and then the horizontal directions in turn. The magnitude of the responses in the vertical and horizontal directions are then used to calculate the edge strength, whilst the inverse tangent of their ratio is used to calculate the edge orientation.

Using the formulations disclosed in both the first and second embodiments of the steerable cubic, the DC gain of the kernel is only approximately unity, ie. there will be a visible ripple artefact if the kernel is used to interpolate a smooth area. This however, is not a problem because:

1. in the adaptive system disclosed the π/4 and 3π/4 kernels sill only be used to interpolate oblique edges and not smooth areas; and
2. any ripple effect which occurs when interpolating oblique edges will be effectively masked by the edge and therefore its perceived visibility will be reduced.

Alternatively, after the coefficients have been calculated they can be normalised to have unity gain, ie. each coefficient is multiplied by the reciprocal of sum of the coefficients in the 4×4 block.

PREFERRED EMBODIMENT OF APPARATUS (S)

Figure 8:
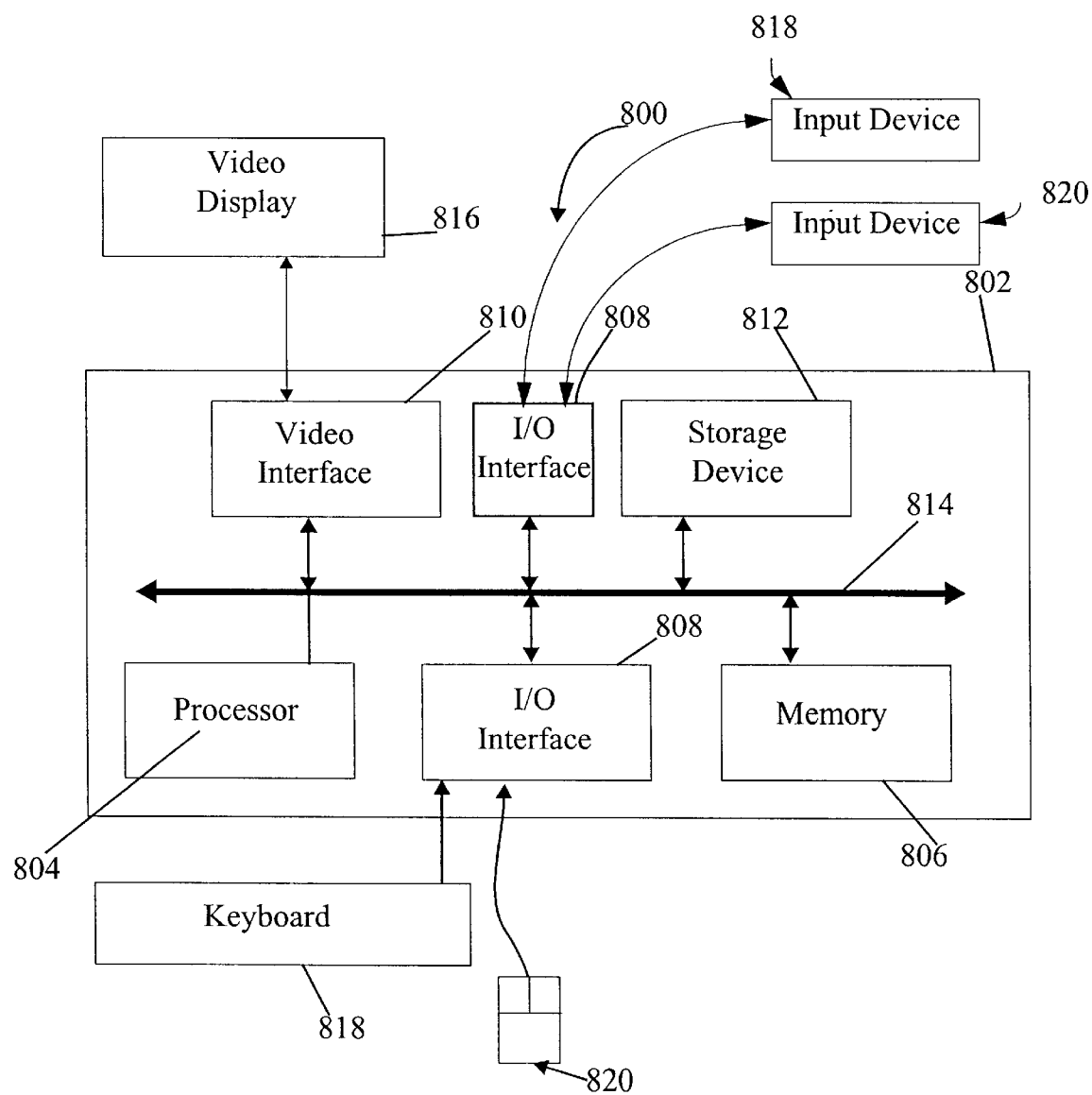
FIG. 8 shows a general purpose computer upon which the method of the preferred embodiment can be practised.

The preferred method is preferably practiced using a conventional general-purpose computer system, such as the system 800 shown in FIG. 8, wherein the process of FIGS. 3 to 7 can be implemented as software executing on the computer. In particular, the steps of the method are effected by instructions in the software that are carried out by the computer. The software can be divided into two separate parts; one part for carrying out the method of the preferred embodiments; and another part to manage the user interface between the latter and the user. The software can be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for reducing edge jaggy and blurring effects in accordance with the embodiments of the invention.

The computer system 800 has a of the computer module 802, a video display 816, and input devices 818, 820. In addition, the computer system 800 can have any of a number of other output devices including line printers, laser printers, plotters, and other reproduction devices connected to the computer module 802. The computer system 800 can be connected to one or more other computers via a communication interface 808c using an appropriate communication channel 830 such as a modem communications path, a computer network, or the like. The computer network can include a local area network (LAN), a wide area network (WAN), an Intranet, and/or the Internet The computer module 802 has a central processing unit(s) (simply referred to as a processor hereinafter) 804, a memory 806 which can include random access memory (RAM) and read-only memory (ROM), input/output (10) interfaces 808, a video interface 810, and one or more storage devices generally represented by a block 812 in FIG. 8. The storage device(s) 812 can include of one or more of the following: a floppy disc, a hard disc drive, a magneto-optical disc drive, CD-ROM, magnetic tape or ants other of a number of non-volatile storage devices well known to those skilled in the art. Each of the components 804 to 812 is typically connected to one or more of the other devices via a bus 814 that in turn has data, address, and control buses.

The video interface 810 is connected to the video display 816 and provides video signals from the computer 802 for display on the video display 816. User input to operate the computer 802 can be provided by one or more input devices 808. For example, an operator can use the keyboard 818 and/or a pointing device such as the mouse 820 to provide input to the computer 802.

The system 800 is simply provided for illustrative purposes and other configurations can be employed without departing from the scope and spirit of the invention. Exemplary computers on which the embodiment can be practiced include the IBM-PC or compatibles, one of the Macintosh™ family of PCs, Sun Sparestation™, arrangements evolved therefrom or the like. The foregoing are merely exemplary of the types of computers with which the embodiments of the invention can be practiced. Typically, the processes of the embodiments, described hereinafter, arc resident as software or a program recorded on a hard disk drive (generally depicted as block 812 in FIG. 8) as the computer readable medium, and read and controlled using the processor 804. Intermediate storage of the program and pixel data and any data fetched from the network can be accomplished using the semiconductor memory 806, possibly in concert with the hard disk drive 812.

In some instances, the program can be supplied to the user encoded on a CD-ROM or a floppy disk (both generally depicted by block 812), or alternatively it can be read by the user from the network via a modem device connected to the computer, for example. Still further, the software can also be loaded into the computer system 800 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums it can be practiced without departing from the scope and spirit of the invention.

The preferred method can alternatively be implemented in dedicated hardware such as one or more integrated circuits performing the functions or sub functions of the steps of the method. Such dedicated hardware can include graphic processors, digital signal processors, or one or more microprocessors and associated memories.

The foregoing only describes one embodiment of the present invention, however, modifications and/or changes can be made thereto by a person skilled in the art without departing from the scope and spirit of the invention.

APPENDIX A

```
/* Calculate the maximum edge strength from the 4 edge */
/* detector orientations */
EdgeStrength = max (VertEdge, HorizEdge, 45Edge, 135Edge)
If (EdgeStrength < Thresh)
    /* This is a smooth area use the conventional cubic */
    2DCubicConv(s_x,c_x=0.5,s_y,c_y=0.5);
Else
    /*There is an edge, determine which kernel to use */
    If(Strongest Edge = VertEdge)
        2DCubicConv(s_x,c_x=0,s_y,c_y=0.5);
    Else If(Strongest Edge = HorizEdge)
        2DCubicConv(s_x,c_x=0.5,s_y,c_y=0);
    Else If(Strongest Edge = 45Edge)
        2DCubicConv((s_x + s_y)/2,c_x=0.5, (s_x-s_y)/sqrt(2),c_y=0);
    Else If(Strongest Edge = 135Edge)
        2DCubicConv((s_x + s_y)/sqrt(2),c_x=0, (s_x-s_y)/2,c_y=0.5);
    End
End
```

APPENDIX B

```
/* Calculate the edge strength in both the horizontal */
/* and vertical orientations */
EdgeMag = sqrt (pow(HorizEdge,2) + pow (VertEdge,2);
EdgeAngle = atan (VertEdge/ HorizEdge);
If(EdgeAngle < 0)
    Edge Angle = EdgeAngle + PI;
If((EdgeAngle < Threshold)
    /* This is a smooth area use the conventional cubic */
    SteerableCubicConv(s_x,c_x=0.5, s_y,c_y=0.5, Angle = 0);
Else If((VertEdge > Vthresh) AND (HorizEdge < Hthresh))
    /*This is a highly curved edge or a corner */
    SteerableCubicConv(s_x,c_x=0, s_y,c_y=0, Angle = 0);
Else
    /*There is a linear edge, use the steerable cubic */
    SteerableCubicConv(s_x,c_x=0.5, s_y,c_y=0, EdgeAngle = 0);
End
```

What is claimed is:

1. A method of providing a representation of image data, the method comprising the following steps:

(i) accessing a plurality of discrete sample values of said image data;

(ii) determining an angle of orientation of said sample values;

(iii) calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and (iv) convolving said kernel values with said discrete sample values to provide a representation of said image data.

2. A method according to claim 1, wherein said first kernels are of the form:

$$h(s_x, s_y)_{\theta=0} = \frac{1}{\sqrt{2}} \{h(s_x)_{c=0.5} \cdot h(s_y)_{c=0}\} \quad (3)$$

$$h(s_x, s_y)_{\theta=\pi/2} = \frac{1}{\sqrt{2}} \{h(s_x)_{c=0} \cdot h(s_y)_{c=0.5}\} \quad (4)$$

$$h(s_x, s_y)_{\theta=\pi/4} = \frac{1}{\sqrt{2}} \left\{ h\left(\frac{s_x + s_y}{2}\right)_{c=0.5} \cdot h\left(\frac{s_x - s_y}{\sqrt{2}}\right)_{c=0} \right\} \quad (5)$$

$$h(s_x, s_y)_{\theta=3\pi/4} = \frac{1}{\sqrt{2}} \left\{ h\left(\frac{s_x + s_y}{\sqrt{2}}\right)_{c=0} \cdot h\left(\frac{s_x - s_y}{2}\right)_{c=0.5} \right\} \quad (6)$$

and wherein s=t/Δt and θ is the angle of orientation of the sample.

3. A method according to claim 1, wherein said first kernels are of the form:

$$h(s_x, s_y)_{0 \le \theta \le \pi/2} = \frac{1}{\sqrt{2}} \{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2<\theta<\pi} = \frac{1}{\sqrt{2}} \{h((2\theta/\pi - 1)s_x + (2\theta/\pi - 2)s_y)_{c=0.5} \cdot h(((2\theta/\pi - 2)s_x + (1 - 2\theta/\pi)s_y)w(\theta))_{c=0}\} \quad (7)$$

and wherein s=t/Δt and θ is the angle of orientation of the sample.

4. A method according to any one of claims 1 to 3, wherein said second kernel is a cubic kernel.

5. A method according to claim 1, wherein said second kernel is a quadratic kernel.

6. A method according to claim 1, wherein said second kernel is a weighted sinc kernel.

7. A method according to claim 1, wherein said second kernel is a linear interpolation kernel.

8. A method according to claim 1, wherein said image data is colour image data.

9. A method according to claim 8, wherein said steps (i) to (iv) are carried out for each colour plane of said colour image data.

10. A method according to claim 8, wherein said steps (i) to (iv) are carried out for a luminance component of said colour image data.

11. A method according to claim 1, said method comprising the further step of convolving each filtered sample value with at least one other kernel to produce a second set of filtered sample values.

12. An apparatus for providing a representation of image data, the apparatus comprising:

accessing means for accessing a plurality of discrete sample values of said image data;

angle orientation determining means for determining an angle of orientation of said sample values;

calculating means for calculating kernel values for each of said discrete sample values, using one of a plurality of first kernels depending upon the angle of orientation of said discrete sample value, wherein said first kernels are constructed by rotating a second kernel from a first angle of orientation to a second angle of orientation; and convolving means for convolving said kernel values with said discrete sample values to provide a representation of said image data.

13. The apparatus according to claim 12, wherein said first kernels are of the form:

$$h(s_x, s_y)_{\theta=0} = \frac{1}{\sqrt{2}} \{h((s_x)_{c=0.5} \cdot h(s_y)_{c=0}\} \qquad (3)$$

$$h(s_x, s_y)_{\theta=\pi/2} = \frac{1}{\sqrt{2}} \{h(s_x)_{c=0} \cdot h(s_y)_{c=0.5}\} \qquad (4)$$

$$h(s_x, s_y)_{\theta=\pi/4} = \frac{1}{\sqrt{2}} \left\{ h\left(\frac{s_x + s_y}{2}\right)_{c=0.5} \cdot h\left(\frac{s_x - s_y}{\sqrt{2}}\right)_{c=0} \right\} \qquad (5)$$

$$h(s_x, s_y)_{\theta=3\pi/4} = \frac{1}{\sqrt{2}} \left\{ h\left(\frac{s_x + s_y}{\sqrt{2}}\right)_{c=0} \cdot h\left(\frac{s_x - s_y}{2}\right)_{c=0.5} \right\} \qquad (6)$$

and wherein $s = t/\Delta t$ and $\theta$ is the angle of orientation of the sample.

14. The apparatus according to claim 12, wherein said first kernels are of the form:

$$h(s_x, s_y)_{0 \le \theta \le \pi/2} = \frac{1}{\sqrt{2}} \{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}} \{h((2\theta/\pi - 1)s_x + (2\theta/\pi - 2)s_y)_{c=0.5} \cdot h(((2\theta/\pi - 2)s_x + (1 - 2\theta/\pi)s_y)w(\theta))_{c=0}\},$$

and wherein $s = t/\Delta t$ and $\theta$ is the angle of orientation of the sample.

15. The apparatus according to claim 12, wherein said second kernel is a cubic kernel.

16. The apparatus according to claim 12, wherein said second kernel is a quadratic kernel.

17. The apparatus according to claim 12, wherein said second kernel is a weighted sinc kernel.

18. The apparatus according to claim 12, wherein said second kernel is a linear interpolation kernel.

19. The apparatus according to claim 12, wherein said image data is colour image data.

20. The apparatus according to claim 12, wherein said convolving means convolves each filtered sample value with at least one other kernel to produce a second set of filtered sample values.

21. A computer readable medium for storing a program for an apparatus which processes data, said processing comprising a method of providing a representation of image data, said program comprising:

code for accessing a plurality of discrete sample values of said image data;

code for determining an angle of orientation of said sample values;

code for calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and code for convolving said kernel values with said discrete sample values to provide a representation of said image data.

22. The computer readable medium according to claim 21, wherein said first kernels are of the form:

$$h(s_x, s_y)_{\theta=0} = \frac{1}{\sqrt{2}} \{h((s_x)_{c=0.5} \cdot h(s_y)_{c=0}\} \qquad (3)$$

$$h(s_x, s_y)_{\theta=\pi/2} = \frac{1}{\sqrt{2}} \{h(s_x)_{c=0} \cdot h(s_y)_{c=0.5}\} \qquad (4)$$

$$h(s_x, s_y)_{\theta=\pi/4} = \frac{1}{\sqrt{2}} \left\{ h\left(\frac{s_x + s_y}{2}\right)_{c=0.5} \cdot h\left(\frac{s_x - s_y}{\sqrt{2}}\right)_{c=0} \right\} \qquad (5)$$

-continued $$h(s_x, s_y)_{\theta=3\pi/4} = \frac{1}{\sqrt{2}} \left\{ h\left(\frac{s_x + s_y}{\sqrt{2}}\right)_{c=0} \cdot h\left(\frac{s_x - s_y}{2}\right)_{c=0.5} \right\} \qquad (6)$$

and wherein $s = t/\Delta t$ and $\theta$ is the angle of orientation of the sample.

23. The computer readable medium according to claim 21, wherein said first kernels are of the form:

$$h(s_x, s_y)_{0 \le \theta \le \pi/2} = \frac{1}{\sqrt{2}} \{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}} \{h((2\theta/\pi - 1)s_x + (2\theta/\pi - 2)s_y)_{c=0.5} \cdot h(((2\theta/\pi - 2)s_x + (1 - 2\theta/\pi)s_y)w(\theta))_{c=0}\},$$

and wherein $s = t/\Delta t$ and $\theta$ is the angle of orientation of the sample.

24. The computer readable medium according to claim 21, wherein said second kernel is a cubic kernel.

25. The computer readable medium according to claim 21, wherein said second kernel is a quadratic kernel.

26. The computer readable medium according to claim 21, wherein said second kernel is a weighted sinc kernel.

27. The computer readable medium according to claim 21, wherein said second kernel is a linear interpolation kernel.

28. The computer readable medium according to claim 21, wherein said image data is colour image data.

29. The computer readable medium according to claim 21, said method comprising the further step of convolving each filtered sample value with at least one other kernel to produce a second set of filtered sample values.

30. A method of providing a representation of image data, the method comprising the following steps:
   (i) accessing a plurality of discrete sample values of said image data;
   (ii) determining an angle of orientation of each said sample values;
   (iii) calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and
   (iv) convolving said kernel values with said discrete sample values to provide a representation of said image data, wherein said first kernels are of the form:

$$h(s_x, s_y)_{\theta=0} = \frac{1}{\sqrt{2}}\{h((s_x)_{c=0.5} \cdot h(s_y)_{c=0}\} \quad (3)$$

$$h(s_x, s_y)_{\theta=\pi/2} = \frac{1}{\sqrt{2}}\{h(s_x)_{c=0} \cdot h(s_y)_{c=0.5}\} \quad (4)$$

$$h(s_x, s_y)_{\theta=\pi/4} = \frac{1}{\sqrt{2}}\left\{h\left(\frac{s_x+s_y}{2}\right)_{c=0.5} \cdot h\left(\frac{s_x-s_y}{\sqrt{2}}\right)_{c=0}\right\} \quad (5)$$

$$h(s_x, s_y)_{\theta=3\pi/4} = \frac{1}{\sqrt{2}}\left\{h\left(\frac{s_x+s_y}{\sqrt{2}}\right)_{c=0} \cdot h\left(\frac{s_x-s_y}{2}\right)_{c=0.5}\right\} \quad (6)$$

and wherein $s=t/\Delta t$ and $\theta$ is the angle of orientation of the sample.

31. A method according to claim 30, wherein said second kernel is a cubic kernel.

32. A method according to claim 30, wherein said second kernel is a quadratic kernel.

33. A method according to claim 30, wherein said second kernel is a weighted sinc kernel.

34. A method according to claim 30, wherein said second kernel is a linear interpolation kernel.

35. A method according to claim 30, wherein said image data is colour image data.

36. A method according to claim 35, wherein steps (I) to (iv) are carried out for each colour plane of said colour image data.

37. A method according to claim 35, wherein steps (I) to (iv) are carried out for a luminance component of said colour image data.

38. An apparatus for providing a representation of image data, said apparatus comprising:
   accessing means for accessing a plurality of discrete sample values of said image data;
   angle of orientation determining means for determining an angle of orientation of each said sample values;
   calculating means for calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and
   convolving means for convolving said kernel values with said discrete sample values to provide a representation of said image data, wherein said first kernels are of the form:

$$h(s_x, s_y)_{\theta=0} = \frac{1}{\sqrt{2}}\{h((s_x)_{c=0.5} \cdot h(s_y)_{c=0}\} \quad (3)$$

$$h(s_x, s_y)_{\theta=\pi/2} = \frac{1}{\sqrt{2}}\{h(s_x)_{c=0} \cdot h(s_y)_{c=0.5}\} \quad (4)$$

$$h(s_x, s_y)_{\theta=\pi/4} = \frac{1}{\sqrt{2}}\left\{h\left(\frac{s_x+s_y}{2}\right)_{c=0.5} \cdot h\left(\frac{s_x-s_y}{\sqrt{2}}\right)_{c=0}\right\} \quad (5)$$

$$h(s_x, s_y)_{\theta=3\pi/4} = \frac{1}{\sqrt{2}}\left\{h\left(\frac{s_x+s_y}{\sqrt{2}}\right)_{c=0} \cdot h\left(\frac{s_x-s_y}{2}\right)_{c=0.5}\right\} \quad (6)$$

and wherein $s=t/\Delta t$ and $\theta$ is the angle of orientation of the sample.

39. The apparatus according to claim 38, wherein said second kernel is a cubic kernel.

40. The apparatus according to claim 38, wherein said second kernel is a quadratic kernel.

41. The apparatus according to claim 38, wherein said second kernel is weighted sinc kernel.

42. The apparatus according to claim 38, wherein said second kernel is a linear interpolation kernel.

43. The apparatus according to claim 38, wherein said image data is colour image data.

44. A computer readable medium for storing a program for an apparatus which processes data, said processing comprising a method of providing a representation of image data, said program comprising:
   code for accessing a plurality of discrete sample values of said image data;
   code for determining an angle of orientation of each said sample values;
   code for calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and
   code for convolving said kernel values with said discrete sample values to provide a representation of said image data, wherein said first kernels are of the form:

$$h(s_x, s_y)_{\theta=0} = \frac{1}{\sqrt{2}}\{h((s_x)_{c=0.5} \cdot h(s_y)_{c=0}\} \quad (3)$$

$$h(s_x, s_y)_{\theta=\pi/2} = \frac{1}{\sqrt{2}}\{h(s_x)_{c=0} \cdot h(s_y)_{c=0.5}\} \quad (4)$$

$$h(s_x, s_y)_{\theta=\pi/4} = \frac{1}{\sqrt{2}}\left\{h\left(\frac{s_x+s_y}{2}\right)_{c=0.5} \cdot h\left(\frac{s_x-s_y}{\sqrt{2}}\right)_{c=0}\right\} \quad (5)$$

$$h(s_x, s_y)_{\theta=3\pi/4} = \frac{1}{\sqrt{2}}\left\{h\left(\frac{s_x+s_y}{\sqrt{2}}\right)_{c=0} \cdot h\left(\frac{s_x-s_y}{2}\right)_{c=0.5}\right\} \quad (6)$$

and wherein $s=t/\Delta t$ and $\theta$ is the angle of orientation of the sample.

45. The computer readable medium according to claim 44, wherein said second kernel is a cubic kernel.

46. The computer readable medium according to claim 44, wherein said second kernel is a quadratic kernel.

47. The computer readable medium according to claim 44, wherein said second kernel is a weighted sinc kernel.

48. The computer readable medium according to claim 44, wherein said second kernel is a linear interpolation kernel.

49. The computer readable medium according to claim 45, wherein said image data is colour image data.

50. A method of providing a representation of image data, the method comprising the following steps:

$$h(s_x, s_y)_{0 \le \theta \le \pi/2} = \frac{1}{\sqrt{2}}\{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}}\{h((2\theta/\pi - 1)s_x + (2\theta/\pi - 2)s_y)_{c=0.5} \cdot h(((2\theta/\pi - 2)s_x + (1 - 2\theta/\pi)s_y)w(\theta))_{c=0}\},$$

(i) accessing a plurality of discrete sample values of said image data;

(ii) determining an angle of orientation of each said sample values;

(iii) calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and (iv) convolving said kernel values with said discrete sample values to provide a representation of said image data, wherein said first kernels are of the form:

$$h(s_x, s_y)_{0 \le \theta \le \pi/2} = \frac{1}{\sqrt{2}}\{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}}\{h((2\theta/\pi - 1)s_x + (2\theta/\pi - 2)s_y)_{c=0.5} \cdot h(((2\theta/\pi - 2)s_x + (1 - 2\theta/\pi)s_y)w(\theta))_{c=0}\},$$

and wherein $s=t/\Delta t$ and $\theta$ is the angle of orientation of the sample.

51. The method according to claim 50, wherein said second kernel is a cubic kernel.

52. The method according to claim 50, wherein said second kernel is a quadratic kernel.

53. The method according to claim 50, wherein said second kernel is a weighted sinc kernel.

54. The method according to claim 50, wherein said second kernel is a linear interpolation kernel.

55. The method according to claim 50, wherein said image data is colour image data.

56. The method according to claim 55, wherein said steps (I) to (iv) are carried out for each colour plane of said colour image data.

57. The method according to claim 55, wherein said steps (I) to (iv) are carried out for a luminance component of said colour image data.

58. An apparatus for providing a representation of image data, said apparatus comprising:

accessing means for accessing a plurality of discrete sample values of said image data;

angle of orientation determining means for determining an angle of orientation of each said sample values;

calculating means for calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and convolving means for convolving said kernel values with said discrete sample values to provide a representation of said image data, wherein said first kernels are of the form:

$$h(s_x, s_y)_{0 \le \theta \le \pi/2} = \frac{1}{\sqrt{2}}\{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}}\{h((2\theta/\pi - 1)s_x + (2\theta/\pi - 2)s_y)_{c=0.5} \cdot h(((2\theta/\pi - 2)s_x + (1 - 2\theta/\pi)s_y)w(\theta))_{c=0}\},$$

and wherein $s=t/\Delta t$ and $\theta$ is the angle of orientation of the sample.

59. The apparatus according to claim 58, wherein said second kernel is a cubic kernel.

60. The apparatus according to claim 58, wherein said second kernel is a quadratic kernel.

61. The apparatus according to claim 58, wherein said second kernel is a weighted sinc kernel.

62. The apparatus according to claim 58, wherein said second kernel is a linear interpolation kernel.

63. The apparatus according to claim 58, wherein said image data is colour image data.

64. A computer readable medium for storing a program for an apparatus which processes data, said processing comprising a method of providing a representation of image data, said program comprising:

code for accessing a plurality of discrete sample values of said image data;

code for determining an angle of orientation of each said sample values;

code for calculating kernel values for each of said discrete sample values using one of a plurality of first kernels depending upon the angle of orientation of said discrete sample value, wherein said first kernels are constructed by rotating a second kernel from a first angle of orientation to a second angle of orientation; and code for convolving said kernel values with said discrete sample values to provide a representation of said image data, wherein said first kernels are of the form:

$$h(s_x, s_y)_{0 \leq \theta \leq \pi/2} = \frac{1}{\sqrt{2}} \{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}} \{h((2\theta/\pi - 1)s_x + (2\theta/\pi - 2)s_y)_{c=0.5} \cdot h(((2\theta/\pi - 2)s_x + (1 - 2\theta/\pi)s_y)w(\theta))_{c=0}\},$$

and wherein s=t/Δt and θ is the angle of orientation of the sample.

65. The computer readable medium according to claim 64, wherein said second kernel is a cubic kernel.

66. The computer readable medium according to claim 64, wherein said second kernel is a quadratic kernel.

67. The computer readable medium according to claim 64, wherein said second kernel is a weighted sinc kernel.

68. The computer readable medium according to claim 64, wherein said second kernel is a linear interpolation kernel.

69. The computer readable medium according to claim 64, wherein said image data is colour image data.

70. A method of converting a first set of discrete data sample values of an image having a first sample rate to a second set of discrete data sample values of said image having a second sample rate, the method comprising the following steps:

(i) accessing said first set of data sample values; and
(ii) performing the following operations for each data value of said second set;
   (a) determining an angle of orientation for each of said discrete sample values of said first set;
   (b) calculating kernel values for each of said discrete sample values of said first set, according to one of a plurality of first kernels depending upon the angle of orientation of each of said discrete sample values, wherein said first kernels are constructed by rotating a second kernel from a first angle of orientation to a second angle of orientation; and
   (c) convolving said kernel values with said discrete sample values of said first data set to provide a current data value of said second set.

71. The method according to claim 70, wherein said first kernels are of the form:

$$h(s_x, s_y)_{\theta=0} = \frac{1}{\sqrt{2}} \{h(s_x)_{c=0.5} \cdot h(s_y)_{c=0}\} \quad (3)$$

$$h(s_x, s_y)_{\theta=\pi/2} = \frac{1}{\sqrt{2}} \{h(s_x)_{c=0} \cdot h(s_y)_{c=0.5}\} \quad (4)$$

$$h(s_x, s_y)_{\theta=\pi/4} = \frac{1}{\sqrt{2}} \left\{ h\left(\frac{s_x + s_y}{2}\right)_{c=0.5} \cdot h\left(\frac{s_x - s_y}{\sqrt{2}}\right)_{c=0} \right\} \quad (5)$$

-continued $$h(s_x, s_y)_{\theta=3\pi/4} = \frac{1}{\sqrt{2}} \left\{ h\left(\frac{s_x + s_y}{\sqrt{2}}\right)_{c=0} \cdot h\left(\frac{s_x - s_y}{2}\right)_{c=0.5} \right\} \quad (6)$$

and wherein s=t/Δt and θ is the angle of orientation of the sample.

72. The method according to claim 70, wherein said first kernels are of the form:

$$h(s_x, s_y)_{0 \leq \theta \leq \pi/2} = \frac{1}{\sqrt{2}} \{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}} \{h((2\theta/\pi - 1)s_x + (2\theta/\pi - 2)s_y)_{c=0.5} \cdot h(((2\theta/\pi - 2)s_x + (1 - 2\theta/\pi)s_y)w(\theta))_{c=0}\},$$

and wherein s=t/Δt and θ is the angle of orientation of the sample.

73. The method according to claim 70, wherein said second kernel is a cubic kernel.

74. The method according to claim 70, wherein said second kernel is a quadratic kernel.

75. The method according to claim 70, wherein said second kernel is a weighted sinc kernel.

76. The method according to claim 70, wherein said second kernel is a linear interpolation kernel.

77. The method according to claim 70, wherein said image data is colour image data.

78. The method according to claim 77, wherein step (ii) is carried out for each colour plane of said colour image.

79. The method according to claim 77, wherein step (ii) is carried out for a luminance component of said colour image.

80. An apparatus for converting a first set of discrete data sample values of an image having a first sample rate to a second set of discrete data sample values of said image having a second sample rate, the method comprising the following steps:

accessing means for accessing said first set of data sample values; and processing means for performing the following operations for each data value of said second set;
   (a) determining an angle of orientation for each of said discrete sample values of said first set;
   (b) calculating kernel values for each of said discrete sample values of said first set, according to one of a plurality of first kernels depending upon the angle of orientation of each of said discrete sample values, wherein said first kernels are constructed by rotating a second kernel from a first angle of orientation to a second angle of orientation; and
   (c) convolving said kernel values with said discrete sample values of said first data set to provide a current data value of said second set.

81. The apparatus according to claim 80, wherein said first kernels are of the form:

$$h(s_x, s_y)_{\theta=0} = \frac{1}{\sqrt{2}} \{h(s_x)_{c=0.5} \cdot h(s_y)_{c=0}\} \quad (3)$$

$$h(s_x, s_y)_{\theta=\pi/2} = \frac{1}{\sqrt{2}} \{h(s_x)_{c=0} \cdot h(s_y)_{c=0.5}\} \quad (4)$$

$$h(s_x, s_y)_{\theta=\pi/4} = \frac{1}{\sqrt{2}} \left\{ h\left(\frac{s_x + s_y}{2}\right)_{c=0.5} \cdot h\left(\frac{s_x - s_y}{\sqrt{2}}\right)_{c=0} \right\} \quad (5)$$

$$h(s_x, s_y)_{\theta=3\pi/4} = \frac{1}{\sqrt{2}} \left\{ h\left(\frac{s_x + s_y}{\sqrt{2}}\right)_{c=0} \cdot h\left(\frac{s_x - s_y}{2}\right)_{c=0.5} \right\} \quad (6)$$

and wherein $s=t/\Delta t$ and $\theta$ is the angle of orientation of the sample.

82. The apparatus according to claim 80, wherein said first kernels are of the form:

$$h(s_x, s_y)_{0 \leq \theta \leq \pi/2} = \frac{1}{\sqrt{2}} \{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}} \{h((2\theta/\pi - 1)s_x + (2\theta/\pi - 2)s_y)_{c=0.5} \cdot h(((2\theta/\pi - 2)s_x + (1 - 2\theta/\pi)s_y)w(\theta))_{c=0}\},$$

and wherein $s=t/\Delta t$ and $\theta$ is the angle of orientation of the sample.

83. The apparatus according to claim 80, wherein said second kernel is a cubic kernel.

84. The apparatus according to claim 80, wherein said second kernel is a quadratic kernel.

85. The apparatus according to claim 80, wherein said second kernel is a weighted sinc kernel.

86. The apparatus according to claim 80, wherein said second kernel is a linear interpolation kernel.

87. The apparatus according to claim 80, wherein said image is a colour image.

88. A computer readable medium for storing a program for an apparatus which processes data, said processing comprising a method of converting a first set of discrete data sample values of an image having a first sample rate to a second set of discrete data sample values of said image having a second sample rate, said program comprising:
 code for accessing said first set of data sample values; and
 code for performing the following operations for each data value of said second set;
  (a) determining an angle of orientation for each of said discrete sample values of said first set;
  (b) calculating kernel values for each of said discrete sample values of said first set, according to one of a plurality of first kernels depending upon the angle of orientation of each of said discrete sample values, wherein said first kernels are constructed by rotating a second kernel from a first angle of orientation to a second angle of orientation; and
  (c) convolving said kernel values with said discrete sample values of said first data set to provide a current data value of said second set.

89. The computer readable medium according to claim 88, wherein said first kernels are of the form:

$$h(s_x, s_y)_{\theta=0} = \frac{1}{\sqrt{2}} \{h(s_x)_{c=0.5} \cdot h(s_y)_{c=0}\} \quad (3)$$

$$h(s_x, s_y)_{\theta=\pi/2} = \frac{1}{\sqrt{2}} \{h(s_x)_{c=0} \cdot h(s_y)_{c=0.5}\} \quad (4)$$

$$h(s_x, s_y)_{\theta=\pi/4} = \frac{1}{\sqrt{2}} \left\{ h\left(\frac{s_x + s_y}{2}\right)_{c=0.5} \cdot h\left(\frac{s_x - s_y}{\sqrt{2}}\right)_{c=0} \right\} \quad (5)$$

-continued $$h(s_x, s_y)_{\theta=3\pi/4} = \frac{1}{\sqrt{2}} \left\{ h\left(\frac{s_x + s_y}{\sqrt{2}}\right)_{c=0} \cdot h\left(\frac{s_x - s_y}{2}\right)_{c=0.5} \right\} \quad (6)$$

and wherein $s=t/\Delta t$ and $\theta$ is the angle of orientation of the sample.

90. The computer readable medium according to claim 88, wherein said first kernels are of the form:

$$h(s_x, s_y)_{0 \leq \theta \leq \pi/2} = \frac{1}{\sqrt{2}} \{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}} \{h((2\theta/\pi - 1)s_x + (2\theta/\pi - 2)s_y)_{c=0.5} \cdot h(((2\theta/\pi - 2)s_x + (1 - 2\theta/\pi)s_y)w(\theta))_{c=0}\},$$

and wherein $s=t/\Delta t$ and $\theta$ is the angle of orientation of the sample.

91. The computer readable medium according to claim 88, wherein said second kernel is a cubic kernel.

92. The computer readable medium according to claim 88, wherein said second kernel is a quadratic kernel.

93. The computer readable medium according to claim 88, wherein said second kernel is a weighted sinc kernel.

94. The computer readable medium according to claim 88, wherein said second kernel is a linear interpolation kernel.

95. The computer readable medium according to claim 88, wherein said image data is colour image data.

<

* * * * *

UNITED STATES PATENT AND TRADEMARK OFFICE
CERTIFICATE OF CORRECTION

PATENT NO.         : 6,748,120 B1
APPLICATION NO. : 09/461054
DATED                  : June 8, 2004
INVENTOR(S)       : Andrew Peter Bradley It is certified that error appears in the above-identified patent and that said Letters Patent is hereby corrected as shown below:

ON COVER PAGE [56] REFERENCES CITED:

Other Publications, after "X-Y": reference "etal.," should read --et al.,--.

COLUMN 3:

Line 5, "$h(s_y)_{c=0.5}$" should read --$h(s_y)_{c=0.5}\}$--; and
　　Line 38, "$h(s_y)_{c=0.5}$" should read --$h(s_y)_{c=0.5}\}$--.

COLUMN 4:

Line 5, "$h(s_y)_{c=0.5}$" should read --$h(s_y)_{c=0.5}\}$--;
　　Line 34, "$\{h(1-2\theta/\pi)s_x$" should read --$\{h((1-2\theta/\pi)s_x$--; and
　　Line 64, "$\{h(1-2\theta/\pi)s_x$" should read --$\{h((1-2\theta/\pi)s_x$--.

COLUMN 5:

Line 25, "arc" should read --are--; and
　　Line 27, "$\{h(1-2\theta/\pi)s_x$" should read --$\{h((1-2\theta/\pi)s_x$--.

COLUMN 8:

Line 52, "and $\pi$ r" should read --and $\pi$--.

COLUMN 9:

Line 12, "$h(s_y)_{c=0.5}$" should read --$h(s_y)_{c=0.5}\}$--; and
　　Line 21, "and indicates" should read --and · indicates--.

COLUMN 10:

Line 56, "embodiment" should read --embodiment.--; and
　　Line 64, "$(s_x, s_y)$" should read --$h(s_x, s_y)$--; and "$\{h(1-2\theta/\pi)s_x$" should read --$\{h((1-2\theta/\pi)s_x$--.

COLUMN 11:

Line 5, "c=o}," should read -- c=o}--;
　　Line 25, "Eero P Simoncelli," should read --Eero P. Simoncelli,--; and
　　Line 49, "sill" should read --will--.

UNITED STATES PATENT AND TRADEMARK OFFICE
CERTIFICATE OF CORRECTION

PATENT NO. : 6,748,120 B1
APPLICATION NO. : 09/461054
DATED : June 8, 2004
INVENTOR(S) : Andrew Peter Bradley It is certified that error appears in the above-identified patent and that said Letters Patent is hereby corrected as shown below:

COLUMN 12:

Line 13, "has a" should read --has a computer--;
Line 24, "Internet" should read --Internet.--;
Line 28, "(10)" should read --(IO)--;
Line 32, "ants" should read --any--;
Line 49, "Sparestation™," should read --Sparcstation™,--; and
Line 53, "arc" should read --are--.

COLUMN 13:

Line 6, "Other" should read --On other--.

COLUMN 15:

Line 22, "{h(($s_x$)$_{c=0.5}$" should read --{h($s_x$)$_{c=0.5}$--; and
Line 25, "h($s_y$)$_{c=0.5}$" should read --h($s_y$)$_{c=0.5}$--.

COLUMN 16:

Line 30, "{h(($s_x$)$_{c=0.5}$" should read --{h($s_x$)$_{c=0.5}$--;
Line 32, "h($s_y$)$_{c=0.5}$" should read --h($s_y$)$_{c=0.5}$}--; and
Claim 23 should read --23. The computer readable medium according to claim 21, wherein said first kernels are of the form:

$$h(s_x, s_y)_{0 \le \theta < \pi/2} = \frac{1}{\sqrt{2}} \left\{ h\big((1 - 2\theta/\pi)s_x + (2\theta/\pi)s_y\big)_{c=0.5} \cdot h\big(((2\theta/\pi)s_x + (2\theta/\pi - 1)s_y)w(\theta)\big)_{c=0} \right\}$$

$$h(s_x, s_y)_{\pi/2 \le \theta < \pi} = \frac{1}{\sqrt{2}} \left\{ h\big((2\theta/\pi - 1)s_x + (2\theta/\pi - 2)s_y\big)_{c=0.5} \cdot h\big(((2\theta/\pi - 2)s_x + (1 - 2\theta/\pi)s_y)w(\theta)\big)_{c=0} \right\},$$

and wherein s=t/Δt and θ is the angle of orientation of the sample.--.

UNITED STATES PATENT AND TRADEMARK OFFICE
CERTIFICATE OF CORRECTION

PATENT NO. : 6,748,120 B1
APPLICATION NO. : 09/461054
DATED : June 8, 2004
INVENTOR(S) : Andrew Peter Bradley It is certified that error appears in the above-identified patent and that said Letters Patent is hereby corrected as shown below:

COLUMN 17:

Line 30, "{h(($s_x$)$_{c=0.5}$" should read --{h($s_x$)$_{c=0.5}$--;
Line 33, "h($s_y$)$_{c=0.5}$" should read --h($s_y$)$_{c=0.5}$}--;
Line 54, "(I) to" should read --(i) to--; and
Line 57, "(I) to" should read --(i) to--.

COLUMN 18:

Line 11, "{h(($s_x$)$_{c=0.5}$" should read --{h($s_x$)$_{c=0.5}$--;
Line 14, "h($s_y$)$_{c=0.5}$" should read --h($s_y$)$_{c=0.5}$}--;
Line 54, "{h(($s_x$)$_{c=0.5}$" should read --{h($s_x$)$_{c=0.5}$--;
Line 56, "h($s_y$)$_{c=0.5}$" should read --h($s_y$)$_{c=0.5}$}--;

COLUMN 19:

Line 59, "(I) to" should read --(i) to--; and
Line 62, "(I) to" should read --(i) to--.

COLUMN 21:

Line 62, "h($s_y$)$_{c=0.5}$" should read --h($s_y$)$_{c=0.5}$}--.

COLUMN 22:

Claim 72 should read --72. The method according to claim 70, wherein said first kernels are of the form:

$$h(s_x, s_y)_{0 \leq \theta \leq \pi/2} = \frac{1}{\sqrt{2}} \left\{ h\big((1 - 2\theta/\pi)s_x + (2\theta/\pi)s_y\big)_{c=0.5} \cdot h\big(((2\theta/\pi)s_x + (2\theta/\pi - 1)s_y)w(\theta)\big)_{c=0} \right\}$$

$$h(s_x, s_y)_{\pi/2 \leq \theta \leq \pi} = \frac{1}{\sqrt{2}} \left\{ h\big((2\theta/\pi - 1)s_x + (2\theta/\pi - 2)s_y\big)_{c=0.5} \cdot h\big(((2\theta/\pi - 2)s_x + (1 - 2\theta/\pi)s_y)w(\theta)\big)_{c=0} \right\}$$

and wherein s=t/Δt and θ is the angle of orientation of the sample.--.

UNITED STATES PATENT AND TRADEMARK OFFICE
CERTIFICATE OF CORRECTION

PATENT NO.         : 6,748,120 B1
APPLICATION NO.    : 09/461054
DATED              : June 8, 2004
INVENTOR(S)        : Andrew Peter Bradley It is certified that error appears in the above-identified patent and that said Letters Patent is hereby corrected as shown below:

COLUMN 23:

Line 5, "$h(s_y)_{c=0.5}$" should read --$h(s_y)_{c=0.5}\}$--.

COLUMN 24:

Line 12, "$h(s_y)_{c=0.5}$" should read --$h(s_y)_{c=0.5}\}$--.

Signed and Sealed this

Third Day of October, 2006

JON W. DUDAS
*Director of the United States Patent and Trademark Office*